(12) United States Patent
Wilding (10) Patent No.: US 12,106,153 B2
(45) Date of Patent: Oct. 1, 2024

(54) TENANT-LEVEL MONITORING

(71) Applicant: salesforce.com, inc., San Francisco, CA (US)

(72) Inventor: Mark F. Wilding, Issaquah, WA (US)

(73) Assignee: Salesforce, Inc., San Francisco, CA (US)

( * ) Notice: Subject to any disclaimer, the term of this patent is extended or adjusted under 35 U.S.C. 154(b) by 407 days.

(21) Appl. No.: 17/364,338

(22) Filed: Jun. 30, 2021

(65) Prior Publication Data

US 2023/0004432 A1    Jan. 5, 2023

(51) Int. Cl.
*G06F 9/50* (2006.01)
*G06F 9/455* (2018.01)
*G06F 11/34* (2006.01)

(52) U.S. Cl.
CPC ......... *G06F 9/505* (2013.01); *G06F 9/45558* (2013.01); *G06F 11/3476* (2013.01); *G06F 2009/45591* (2013.01)

(58) Field of Classification Search
CPC .. G06F 9/505; G06F 9/45558; G06F 11/3476; G06F 2009/45591; G06F 11/3006; G06F 11/3438; G06F 11/301; G06F 2201/815
See application file for complete search history.

(56) References Cited

U.S. PATENT DOCUMENTS

| | | | | |
|---|---|---|---|---|
| 8,701,108 B2 * | 4/2014 | Sekiguchi | ........... | G06F 9/45558 718/1 |
| 8,850,432 B2 * | 9/2014 | McGrath | ............... | G06F 9/5077 718/1 |
| 9,519,801 B2 | 12/2016 | Wilding | | |
| 9,684,570 B1 | 6/2017 | Wilding | | |
| 9,703,611 B1 * | 7/2017 | Christopher | .......... | G06F 9/5027 |
| 9,720,954 B2 | 8/2017 | Wilding | | |
| 9,727,598 B2 | 8/2017 | Wilding | | |
| 9,875,164 B2 | 1/2018 | Wilding | | |
| 9,992,264 B2 | 6/2018 | Wilding | | |
| 10,387,291 B2 | 8/2019 | Wunderlich et al. | | |
| 10,409,701 B2 | 9/2019 | Wilding | | |
| 10,467,117 B2 | 11/2019 | Wilding | | |
| 10,567,475 B2 | 2/2020 | Wilding | | |
| 10,733,083 B2 | 8/2020 | Wilding et al. | | |

(Continued)

*Primary Examiner* — Hiren P Patel (74) *Attorney, Agent, or Firm* — Kowert, Hood, Munyon, Rankin & Goetzel, P.C.; Paul T. Seegers; Dean M. Munyon (57) ABSTRACT

Techniques are disclosed relating to monitoring behavior of a computing system shared by multiple tenants. In some embodiments, a computer cluster is maintained that hosts containers accessible to a plurality of tenants of the computer cluster. First telemetry data collected about a particular one of the plurality of tenants is received from a container hosted at a first of a plurality of servers of the computer cluster. The first telemetry data identifies the particular tenant's consumption of a resource provided by the container. In response to the computer cluster migrating the container from the first server to a second of the plurality of servers, second telemetry data collected about the particular tenant's consumption of the resource is received from the migrated container hosted at the second server. An analysis is performed of the first and second telemetry data to identify whether the particular tenant's consumption of the resource has changed.

20 Claims, 6 Drawing Sheets

(56) References Cited

U.S. PATENT DOCUMENTS

| | | | |
|---|---|---|---|
| 2010/0115049 A1* | 5/2010 | Matsunaga | G06F 9/45558 |
| | | | 718/1 |
| 2016/0357739 A1* | 12/2016 | Rathinagiri | G06F 16/1827 |
| 2017/0063722 A1* | 3/2017 | Cropper | G06F 16/285 |
| 2017/0318083 A1* | 11/2017 | Ignatyev | H04L 43/0876 |
| 2018/0046665 A1 | 2/2018 | Wilding | |
| 2018/0324204 A1* | 11/2018 | McClory | G06F 9/5027 |
| 2019/0042322 A1* | 2/2019 | Calhoun | H04L 41/0896 |
| 2019/0324895 A1 | 10/2019 | Wunderlich et al. | |
| 2020/0073776 A1 | 3/2020 | Wilding | |
| 2020/0142753 A1* | 5/2020 | Harwood | G06F 9/52 |
| 2020/0174832 A1 | 6/2020 | Wilding | |
| 2020/0174833 A1 | 6/2020 | Wilding | |
| 2020/0174834 A1 | 6/2020 | Wilding | |
| 2020/0174852 A1 | 6/2020 | Wilding | |
| 2020/0174887 A1 | 6/2020 | Wilding | |
| 2020/0174918 A1 | 6/2020 | Wilding | |
| 2020/0175157 A1 | 6/2020 | Wilding | |
| 2020/0364136 A1 | 11/2020 | Wilding et al. | |
| 2021/0334178 A1* | 10/2021 | Yang | G06F 11/3495 |
| 2023/0004419 A1* | 1/2023 | Du | G06F 9/5088 |

* cited by examiner

TENANT-LEVEL MONITORING

BACKGROUND

Technical Field

This disclosure relates generally to distributed computing systems and, more specifically, to monitoring behavior of a distributed computing system shared by multiple tenants.

Description of the Related Art

In an enterprise environment, a company may operate multiple servers that provide various services for its environment. To appropriately manage these servers, software may be installed that tracks various metrics about the servers over time. For example, it may be helpful track a given server's processor and memory usage, network bandwidth consumption, etc. These metrics can then be used to facilitate planning and scaling. For example, if a particular server providing an important service starts routinely running up against processor or memory constraints, an administrator could discern from these metrics that it may make sense to upgrade the server or purchase additional servers. These metrics can also be used for diagnosing problems such as discerning a faulty network connection when a server's pack loss suddenly spikes.

The computing industry, however, is starting to move away from a traditional model in which a company may operate its own servers to a cloud computing model in which multiple companies are tenants of a shared computing cluster that hosts their content. Advantages of this approach are that expensive underlying hardware can be more efficiently used and individual companies are not responsible for maintaining it. The new approach, however, proposes a challenge for traditional computing system monitoring techniques.

DETAILED DESCRIPTION

In large computing clusters having high numbers of tenants, tenants may be frequently relocated from one group of servers to another as tenant demands and available resources change over time. This added tenant mobility can result in traditional server metrics being far less useful as it can be difficult to establish some baseline that can be used to identify problems. For example, if a given server's memory and processor consumptions change, it may be difficult to discern whether this change is attributable to some problem or merely resultant from a change in the tenants currently assigned to the server. General system health may also be a crude way for diagnosing specific problems.

Large computing clusters may also generate enough metadata making it impossible for an administrative user to process all this metadata. For example, an administrative user may begin his or her investigation based on a small number of signals such as an alert and attempt to drill down from these signals. This user, however, may struggle with the vast amount and diversity of monitoring information, any of which could be closely related to the root cause of some problem being investigated. Manually diagnosing a problem in this manner thus becomes an inherently slow and expensive process.

The present disclosure describes embodiments in which tenant telemetry data is collected on a per-tenant basis and processed using automated analysis. As will be discussed below in various embodiments, a computer cluster hosts containers accessible to multiple tenants of the computer cluster. These containers may, for example, belong to individual tenants and include applications and/or data, which are accessed by the tenant's users. As containers are moved around among various servers implementing the computer cluster, telemetry data may be collected on a per-tenant basis about a given tenant's use of underlying resources. These resources may be components within a given container such as applications, libraries, data, etc. These resources may also be resources external to a given container, but accessible to a tenant through the container. Examples of these resources may include underlying infrastructure (such as a server's processors, memory, persistent storage, network interfaces), a host operating system running on the server, other applications executing on the server, etc. This telemetry data may also be collected from various sources such as from the containers themselves, the underlying infrastructure at a given host server, a container manager, etc.

In various embodiments, this telemetry data is aggregated for multiple tenants scattered across the cluster and processed for analysis. As part of performing this analysis, a computing system may examine various metrics about a particular tenant over time to establish a baseline for the tenant's usage of resources and identify whether a deviation has occurred from this baseline, which may be indicative of some underlying issue. For example, received telemetry data might indicate that users of a particular tenant access a particular application for three hours a day on average. If this drops to a few minutes a day, the computing system may identify this deviation and raise it to the attention of an administrator as this deviation may be reflective of an underlying problem—e.g., that an update to the application's user interface was not well received by the users. In various embodiments, this analysis considers numerous metrics and may further be able to leverage metrics collected about other tenants. For example, if a source of a problem was successfully identified for a first tenant having particular issues, the knowledge of this source might be helpful to another tenant suffering from another problem, which appears to have similar issues. In such an embodiment, the computing system may flag the issue to the other tenant before an admin has even reported the issue and suggest the source of the problem identified for the first tenant—e.g., that a particular driver is known to be faulty when configured in a particular manner.

In many instances, this approach to automating analysis and identification of problems (and their corresponding causes) can dramatically reduce human effort. The approach can also improve the availability and quality of underlying telemetry data as a computing system may be capable of investigating thousands or even millions of metrics/signals.

Figure 1:
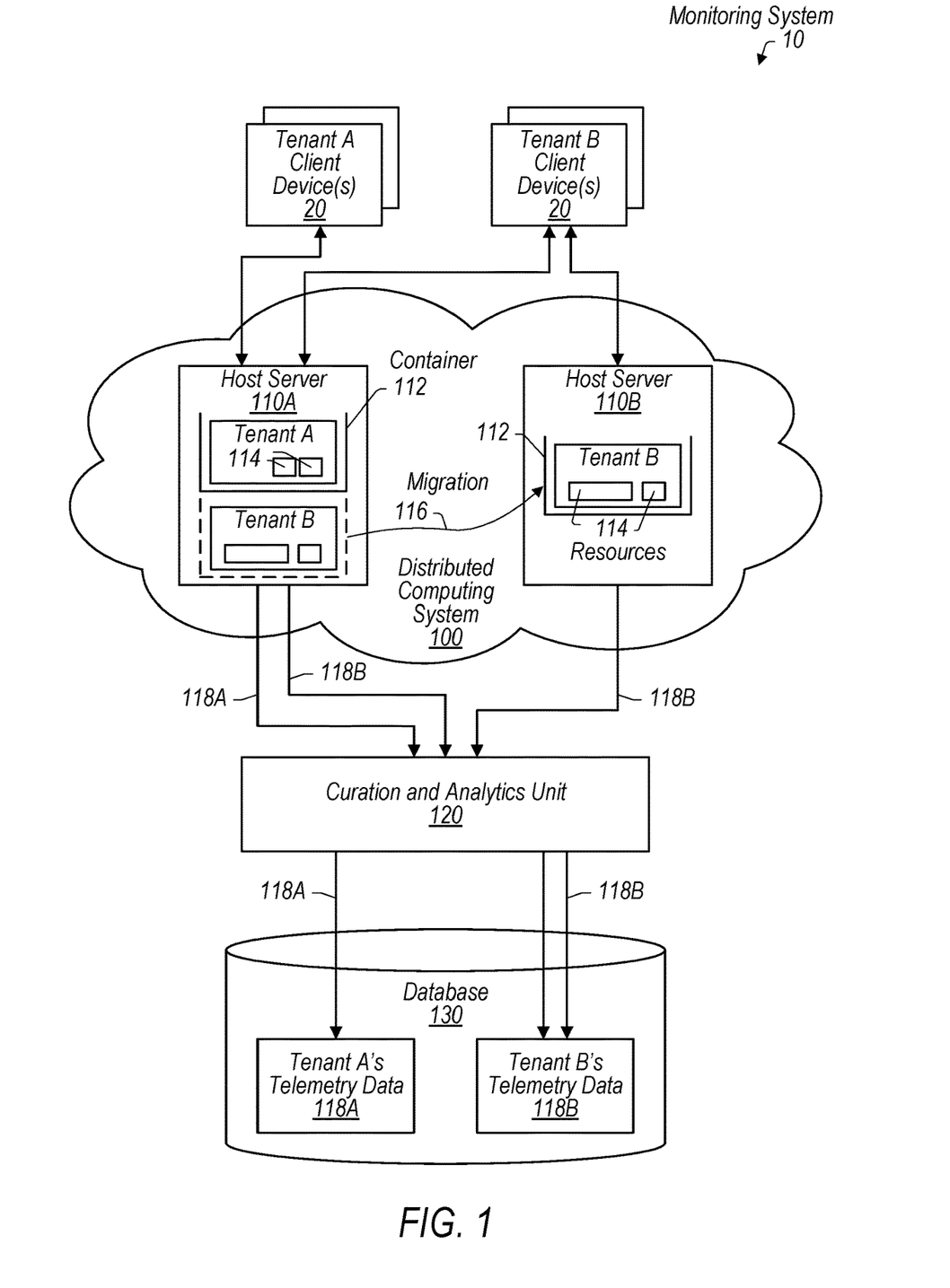
FIG. 1 is a block diagram of one embodiment of a system for monitoring tenants hosted by a distributed computing system.

Turning now to FIG. 1, a block diagram of a monitoring system 10 is depicted. In the illustrated embodiment, monitoring system 10 includes a distributed computing system 100 that includes multiple host servers 110, which interface with client devices 20. Monitoring system 10 also includes a curation and analytics unit 120 and a database 130. In other embodiments, system 10 may be implemented differently than shown—e.g., system 100 may include more host servers 110, which may include more containers 112.

Distributed computing system 100, in various embodiments, is a computer cluster (shown as a cloud) that includes multiple host servers 110 working together to provide various services. Host servers 110, in some embodiments, are server blades housed in multiple server racks, which may be located in a server farm. In some embodiments, servers 110 may be spread across multiple availability zones (AZs), which may reside in different geographic regions. In illustrated embodiment, distributed computing system 100 hosts tenant content using containers 112. In various embodiments, containers 112 are software constructs that include program instructions and/or data packaged in a manner that facilitates easy deployment and relocation. Accordingly, a given container 112 may include program instructions for one or more applications as well as their dependencies such as system libraries, runtime tools, drivers, a guest operating system, etc. Examples of containers 112 may include virtual machines, control groups (Cgroups), namespaces, Linux containers (LXCs), Docker® containers, Heroku® dynos, etc. In some embodiments, containers 112 may belong to a single tenant, which may have multiple containers 112. In some embodiments, containers 112 may be shared by multiple tenants—and containers 112 may contain other containers 112.

Tenants using containers 112 may be enterprise-level companies with large numbers of users or smaller entities with only one or two users. As a result, a given tenant's demands may vary widely from one tenant to the next. A given tenant's demands may also vary over time. For example, a small startup company may operate a small number containers that place only a small load a single host server 110, but, over time, this company may grow in size and place a greater load on distributed computing system 100. Because tenant demands are subject to change, in various embodiments, distributed computing system 100 may migrate containers 112 from one host server 1100 to another. For example, as shown in FIG. 1, distributed computing system 100 may perform a migration 116 of a container 112 being accessed by client devices 20 of a tenant B from host server 110A to host server 110B. This migration 116 may be performed because, for example, tenant A's container 112 is consuming a considerable amount of host servers 110A's memory and host server 110B has additional performance bandwidth. As noted above, however, this added mobility may render general performance metrics collected about host servers 110 less useful than if tenant locations were static.

In various embodiments, however, host servers 110 collect telemetry data 118 on a per-tenant basis and as a tenant is moved around distributed computing system 100 (or more specifically as containers 112 accessed by a tenant are migrated from one set of host servers 110 to the next). This telemetry data 118 may include various metrics about a tenant's usage/consumption of resources 114 provided by containers 112. As will be discussed, these resources 114 may include components within a container 112 such as applications and data or components external to a container 112 such as processors, memory, network interfaces, drivers, operating systems, databases, web servers, external applications, etc. Some examples of resource usage metrics in telemetry data 118 may include a time value indicative of how long a user of the tenant has used an application, a frequency value indicative of how frequently a user has used the application, etc. In some embodiments, telemetry data 118 includes usage pattern information such as individual feature usage, data growth rate, overall feature usage measured in time, number of logins, etc. In some embodiments, telemetry data 118 includes metrics indicative of the underlying user experience such as latency information identifying how long it takes a user to get a response with accessing particular features, an error rate associated with a user's interactions, etc. As will also be discussed, telemetry data 118 may be collected from a variety of sources within a host server 110 such as applications within a container 112, the underlying substrate hosting a container 112, a container manager, etc. Various examples of telemetry data 118 and sources of telemetry data 118 are discussed in greater detail below with respect to FIG. 2.

Telemetry curation and analytics unit 120, in various embodiments, curates tenant telemetry data 118 collected from various host servers 110. In some embodiments, telemetry curation and analytics unit 120 may be executing on one or more of host servers 110; however, in other embodiments, unit 120 may be implemented on separate computing system. As will be described in greater detail below with respect to FIG. 3, telemetry curation and analytics unit 120 may receive vast amounts of data 118 and preprocesses the data 118 to pull out the high-value metrics/signals, which can be used to identify potential problems. In doing so, unit 120 may reduce the overall data set (e.g., by 95% in some embodiments). Telemetry curation and analytics unit 120 may also format and reorganize data 118 in a manner that is more conduce to analysis. For example, in the illustrated embodiment, telemetry curation and analytics 120 stores data 118 in database 130, which is organized based on tenant.

Telemetry curation and analytics unit 120, in various embodiments, is further operable to analyze telemetry data 118 received from multiple host servers 110 and pertaining to multiple tenants. As will be described in greater detail below with respect to FIG. 4, unit 120 may attempt to correlate various metrics based on time to discern whether certain events may be related (e.g., a jump in user latency and a recent change to an operating system configuration). Unit 120 may also apply one or more algorithms to discern pattern changes over time, which may be used identify potential problems. These algorithms may, for example, look at a tenant's (or its users') historical trends based on telemetry data 118 collected over time. These algorithms may also look at trends across multiple tenants. In some embodiments, unit 120 may also provide a user interface (e.g., a dashboard) for presenting analysis results and receiving feedback from a tenant admin. Telemetry curation and analytics unit 120 will be discussed in greater detail below with respect to FIG. 3.

Various examples of possible sources of telemetry data 118 will now be discussed.

Figure 2:
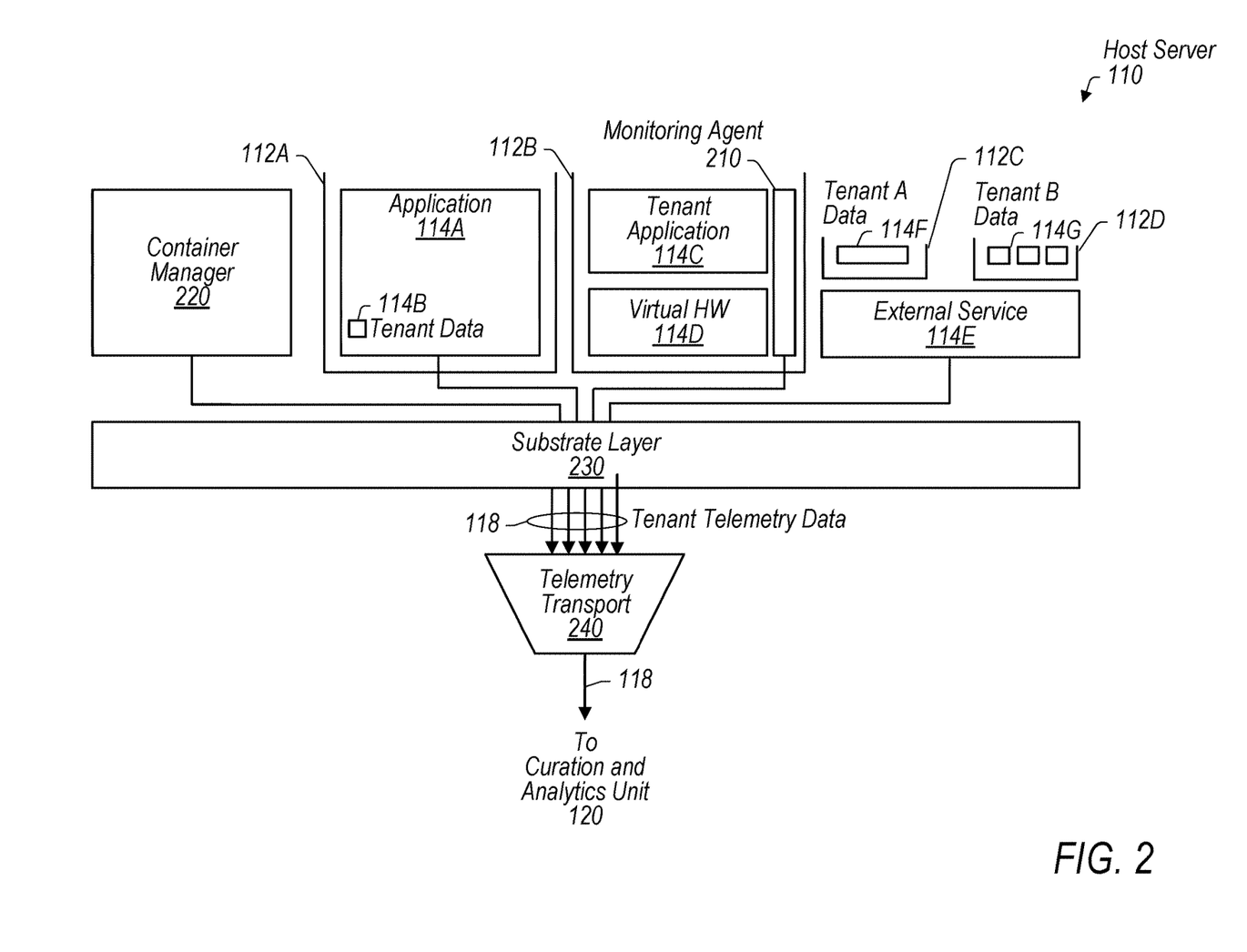
FIG. 2 is a block diagram illustrating one embodiment of components within a host server of the distributed computing system to facilitate monitoring.

Turning now to FIG. 2, a block diagram of host server 110 is depicted. In the illustrated embodiment, host server 110 includes an assortment of containers 112A-D providing access to various resources 114A-G. Host server 110 also includes a container manager 220, an underlying subtracted layer 230, and a telemetry transport 240. In other embodiments, host server 110 may be implemented differently.

As shown, container 112A may include two resources 114: an application 114A and tenant data 114B. In the illustrated embodiment, application 114A is executable to collect and provide its own telemetry data 118. In some embodiments, application 114A may be provided by an operator of distributed computing system 100 or incorporate a plugin provided by the operator and that collects telemetry data 118. Telemetry data 118 associated with application 114A may include, for example, usage information about a tenant's users such as what features of application 114A were accessed, how long were the features accessed, when were the features accessed, what features were most popular among users, how many logins occurred, etc. In the illustrated embodiment, tenant data 114B is data that is operated on by application 114A and may belong to a particular tenant. Telemetry data 118 associated with data 114B may include, for example, the size of data 114B, the growth rate of data 114B, access and update frequencies of data 114B, etc.

Container 112B may include a monitoring agent 210 and another two resources: tenant application 114C and virtual hardware 114D. In the illustrated embodiment, tenant application 114C is an application developed by a tenant that does not have the ability to report telemetry data 118. As a result, monitoring agent 210 may be included to collect and report data 118. In some embodiments, agent 210 may read logs produced by application 114C, configuration files used by application 114C, etc. in order to obtain telemetry data 118. In the illustrated embodiment, virtual hardware 114D is a virtual resource presented by container 112B to facilitate execution of application 114C and may correspond to physical hardware in substrate layer 230. For example, container 112B may present a virtual network interface that is usable by application 114C to convey network traffic with a client device 20 over a physical network interface of host server 110. In such an embodiment, monitoring agent 210 may interface with the software presenting virtual hardware 114D in order to provide telemetry data 118 about the use of this virtual hardware 114D (or the underlying physical hardware). For example, telemetry data 118 may identify an average network latency and an average network bandwidth consumed by application 114C to communicate with a tenant's client devices 20.

Containers 112C and 112D may reside on top of an external service 114E (which may be a resource 114) and include respective data sets 114F and 114G belonging to different tenants (which may be yet another resource 114). In some embodiments, external service 114E may be provide by an application that is shared by multiple tenants and may reside within its own container 112 (not shown). For example, in one embodiment, external service 114E is a database provided by a database application that can process concurrent transactions and service database queries. In the illustrated embodiment, containers 112C and 112D are used to ensure isolation of one tenant's data 114 from another's data 114. Thus, in the databases example, tenant B cannot submit a query and receive back data 114F belonging to tenant A. These containers 112C and 112D may also enable one tenant to be moved to another corresponding external service 114E located at another host server 110 within minimal intrusion—e.g., if tenant A's data 114F (or more generally container 112C) becomes too large for the current host server 110. In some embodiments, external service 114E (or a monitoring agent in container 112C) may report telemetry data 118 about a tenant's use of external service 114E and about a tenant's container 112 being hosted by service 114E. Continuing with the database example, telemetry data provided by service 114E may include the volume of queries, the frequency of queries (including top queries of a particular tenant), the complexities of servicing queries, the size of data 114F, rates for data insertions into the database, etc.

In various embodiments, tenant telemetry data 118 may also originate from sources others than containers 112. For example, in the illustrated embodiment, tenant telemetry data 118 is also provided by container manager 220 and substrate layer 230.

Container manager 220, in various embodiments, manages containers 112 on host server 110. Accordingly, manager 220 may instantiate and provision containers 112. Manager 220 may also monitor container 112 health and take remedial actions based on their health, such as restarting containers 112 and instantiating new ones. In some embodiments, manager 220 may also receive containers 112 migrated from other servers 110 and cause them to be run on host server 110. As manager 220 performs various actions with respect to containers 112, in some embodiments, manager 220 may produce telemetry data 118, which can be collected and provided to curation and analytics unit 120. In some embodiments, manager 220 may be implemented using Kubernetes®, Docker®, etc.

Substrate layer 230, in various embodiments, is the underlying components of host server 110 that facilitate hosting containers 112. This layer 230 may include hardware components such as processors, memory, persistent storage, network interfaces, input/output devices, etc. This layer 230 may also include software components such as a hypervisor, operating system, drivers, APIs, etc. In some embodiments, these components may produce telemetry data 118—and may also correspond to resources 114 accessible via containers 112. Telemetry data 118 may thus include various usage metrics such as the amount of current processor and memory usage are being consumed by a tenant's containers 112.

Telemetry transport 240, in various embodiments, handles the aggregation and transportation of tenant telemetry data 118 from a host server to curation and analytics unit 120. In some embodiments, this may include translating aggregated telemetry data 118 into a format that can be better understood by downstream components such as curation and analytics unit 120. This may include tagging telemetry data 118 with unique identifiers of tenants, so that unit 120 can discern what data 118 pertains to what tenant. Telemetry transport 240 may also time stamp data 118. In various embodiments, transport 240 also packetizes data 118 for transport over a network connection to the computing system hosting curation and analytics unit 120. Transport 240 may then establish the network connection to stream data 118 to unit 120. In some embodiments, transport 240 may be designed to stream content to curation and analytics unit 120 within milliseconds of data 118 being created.

Figure 3:
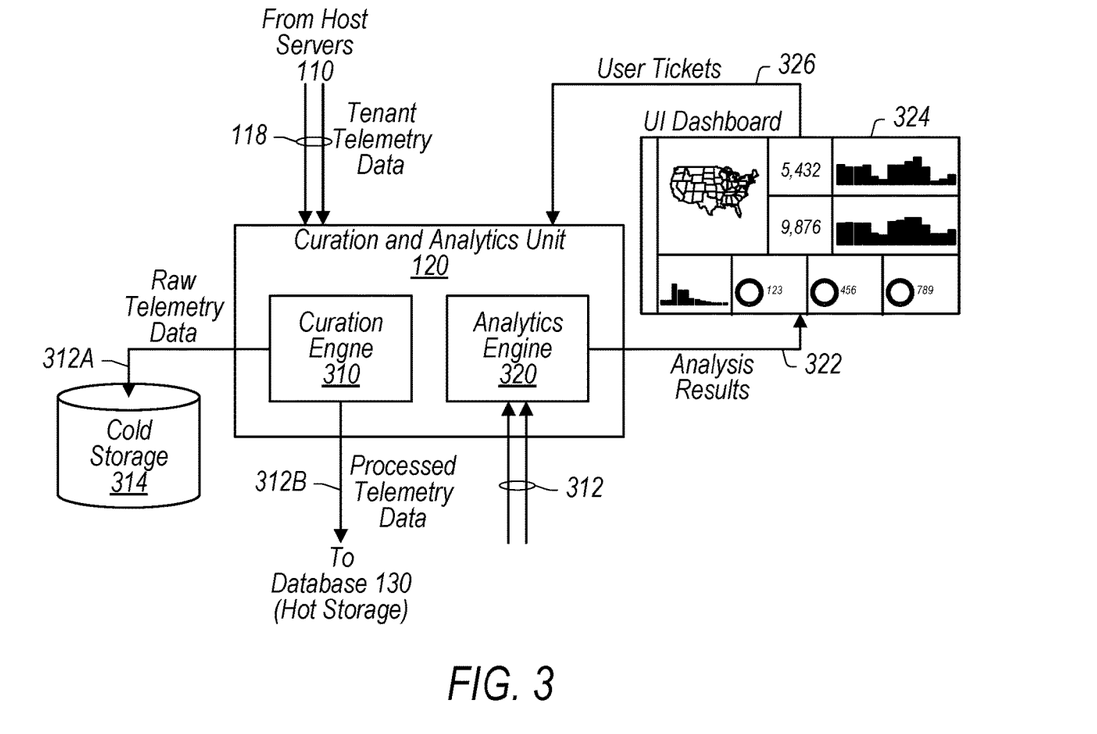
FIG. 3 is a diagram illustrating one embodiment of a curation and analytics unit of the monitoring system.

Turning now to FIG. 3, a block diagram of curation of analytics unit 120 is depicted. In the illustrated embodiment, curation and analytics unit 120 includes a curation engine 310, which may have access to a cold storage 314. Curation and analytics unit 120 also includes analytics engine 320, which may present a user interface dashboard 324. In some embodiments, unit 120 may be implemented differently than shown.

Curation engine 310, in various embodiments, handles the curation of telemetry data 118 received from various host servers 110. On intake, curation engine 310 may perform some initial preprocessing of telemetry data 118 to extract the most valuable metrics from the telemetry data in order to reduce the working data size without losing significant value. For example, curation engine 310 may concentrate on extracting anomalies, sketches/rollups, summaries, alerts, activity timelines, and other signals from encoded domain expertise. Curation engine 310 may also focus on information that can be used to establish a baseline and identify when a deviation occurs—e.g., even a sudden drop in the number of errors per minute might be a valuable indicator of a potential problem. As engine 310 processes incoming tenant telemetry data 118, engine 310 may send the raw telemetry data 312A on to cold storage 314 and separate out interesting data 118, which it sends as processed telemetry data 312B to database 130.

Cold storage 314, in various embodiments, is configured to store raw/unfiltered telemetry data 312A as it comes in, so that it can potentially be analyzed later if more in-depth information is desired. As this data 312A, in some embodiments, may run into the petabytes, storage 314 may be designed to store large quantities of data 312A at much lower cost but may offer less performance than database 130. In some embodiments, however, cold storage 314 may use compression to reduce the size of data 312A. In contrast, database 130, which is functioning as the hot storage in the illustrated embodiment, stores a much smaller data set 312B (e.g., 1% the size of raw telemetry data 312A), which has been processed and organized in manner that improves performance of the analysis.

Analysis engine 320, in various embodiments, handles the analysis of telemetry data 118. As will be discussed with FIG. 4, engine 320 may correlate telemetry data 118 from various sources by organizing the data 118 based on time. This may be used, for example, to determine that several events occurring within the same time intervals may be related to one another. These events may also be associated with individual users, users belonging to the same tenant, users across multiple tenants. Correlating telemetry data 118 in this manner may also allow engine 320 to identify patterns in tenant behavior, which can be used to establish baselines and identify anomalies when substantial deviations from these baselines occur. For example, engine 320 may correlate a production issue occurring at a particular time with its impact on a particular tenant due to changes in the particular tenant's usage patterns after that particular time.

Analytics engine 320 may use any suitable algorithm to analyze telemetry data 118. In some embodiments, engine 320 uses multiple rule-based algorithms. For example, engine 320 may use an algorithm that flags particular events when metrics associated with those events satisfy some preestablished threshold such as an average latency for client devices 20 exceeding some high water mark. In some embodiments engine 320 uses multiple machine learning algorithms. For example, engine 320 may train up a neural network that is effective at identifying particular metrics/signals as being important and discerning when those metrics/signals are indicative of particular problems. In some embodiments, different algorithms may be applied in different phases. For example, in one embodiment, engine 320 may use rule-based algorithms on intake of telemetry data 118 and one or more machine learning algorithms on processed telemetry data 312B collected over time. While, in some embodiments, these algorithms may be broadly applicable, in some embodiments, these algorithms may be tailored to specific services, specific tenants, etc. As noted above, these algorithms may, in general, be able to process large amounts of telemetry data 118 from multiple tenants far more quickly and efficiently than any manual analysis.

User interface dashboard 324, in various embodiments, is a user interface than can present various information including analysis results 322 produced by analytics engine 320. In some embodiments, these results 322 may include notifications of potential problems that have been identified by analysis engine 320 prior to a tenant (or a tenant's administrator) flagging a problem. For example, analysis results 322 might indicate that a particular update pushed by a tenant has caused a change in its users' behaviors—something that may have gone unnoticed by the administrator. In the illustrated embodiment, dashboard 324 also provides a way for a tenant to provide feedback to monitoring system 10 by, for example, submitting user tickets 326—although, in other embodiment, feedback may be provided differently. This feedback may then be used by engine 320 to provide a bridge between tenant reported issues and identified production issues. For example, a user may phone an administrator of tenant and describe a problem including identifying when that problem was initially discovered. The administrator may then submit this information via a ticket 326, which can be used by engine 320 to drill down on particular telemetry data 118 that appears to be relevant to the user's description e.g., the particular data 118 pertains to particular service flagged by the user as performing poorly, the data 118 was collected around the time when the problem was first identified, the data 118 relates to one or more resources 114 being used by the service, etc. Engine 320 may then compare this particular data 118 against data 118 from other users or other tenants. Engine 320 may then present a result 322 that identifies interesting information about the user's situation such as that the user's graphics driver was updated last Friday and there is one other user who has the same graphics driver and had similar problems before. In some embodiments, the fact that a tenant reported issue (e.g., via a ticket 326) can help to train a machine learning algorithm used by engine 320. In addition to troubleshooting, results 322 provided by dashboard 324 may also be used for forecasting, forward planning, obtaining broader insights, etc.

On example of an analysis will now be discussed next.

Figure 4:
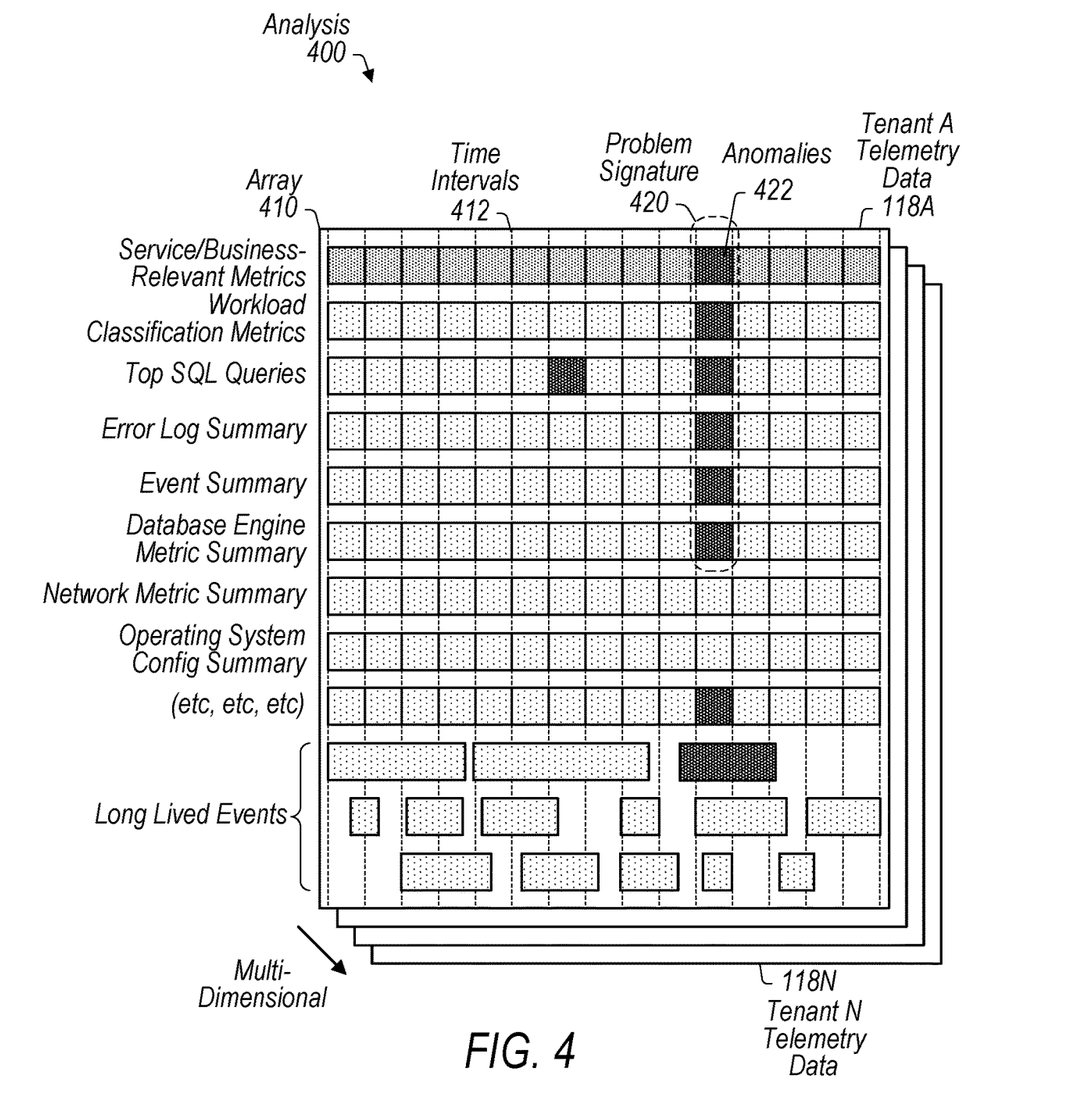
FIG. 4 is a diagram illustrating one embodiment of an analysis of telemetry data collected by the monitoring system.

Turning now to FIG. 4, a block diagram of analysis 400 of telemetry data 118 is depicted. As noted above, various sets of received telemetry data 118 may be organized by tenant and correlated based on the occurrences of events over time. For example, in the illustrated embodiment, data 118 is organized into a multi-dimensional array 410 where one of the dimensions is time intervals 412.

Although arrays 410 may include any suitable information, in the example depicted in FIG. 4, array 410 includes service/business-relevant metrics, workload classification metrics, top SQL queries, error log summaries, event summaries, database engine metric summaries, network summaries, operating system configuration summaries, long lived events, etc. Service/business-relevant metrics may include various metrics indicative of a tenant's experience such as the latencies that users experiencing when accessing resources 114, the errors that users are receiving, the availability (or lack of availability) of resources 114, etc. Workload classification metrics may include metrics indicative of an amount of work load that a tenant is placing on resources 114 over time such as how many database insertions and deletions a tenant is performing with respect to a database resource, how much a tenant is using a particular resource 114 (as opposed to another resource 114), etc. Top SQL queries may include the most frequently executed database queries run by a tenant using a database resource. Error log summary may include metrics such as numbers of server messages, warnings, etc. within a given interval 412, rarities of errors, etc. Event log summary may include metrics such as identified rare events, rates at which particular events occurred, I/O rates, packet loss, TCP retransmissions, etc. Operating system configuration summary may include metrics identifying current configuration settings, what changes were made to settings during an interval 412, etc. Long lived events may include events that occur over multiple intervals 412 such as brining up a new host server 110.

As this various telemetry data 118 is analyzed, analysis engine 320 may determine that various metrics have anomalies 422, which may be indicative of an underlying problem. For example, engine 320 may identify some metrics indicative of the users of a tenant not having a great experience during a particular interval 412 such as users experiencing high latencies. During the same interval 412, engine 320 may notice a spike in system workloads and that the top SQL statements being run changed dramatically. Engine 320 may also notice that some rare errors and atypical events have occurred. Engine 320 may also determine that a long lived event that routinely occurs has not gone well. An administrator may also submit a ticket 326 indicating that the tenant's users were having issues during a particular interval 412. Being able to look at this information in aggregate, engine 320 may identify a signature 420 from these anomalies 422 that is indicative of a particular problem. Analytics engine 320 may then present its analysis results 322 via dashboard 324.

In the illustrated embodiment, telemetry data 118 for one tenant may be stacked based on time interval with telemetry data 118 from other tenants. If analysis engine 320 noticed similar anomalies 422 occurring in data 118 for another tenant during the interval, engine 320 may identify a similar problem signature and raise it to the attention of the other tenant via dashboard 324. In some instances, this may allow the administrator to diagnose and fix a problem prior to the administrator receiving complaints from any of the tenant's users, for example. Analysis engine 320 may also be able indicate, via dashboard 324, to another tenant what the signature 420 has traditionally meant and how to account for this problem.

Figure 5:
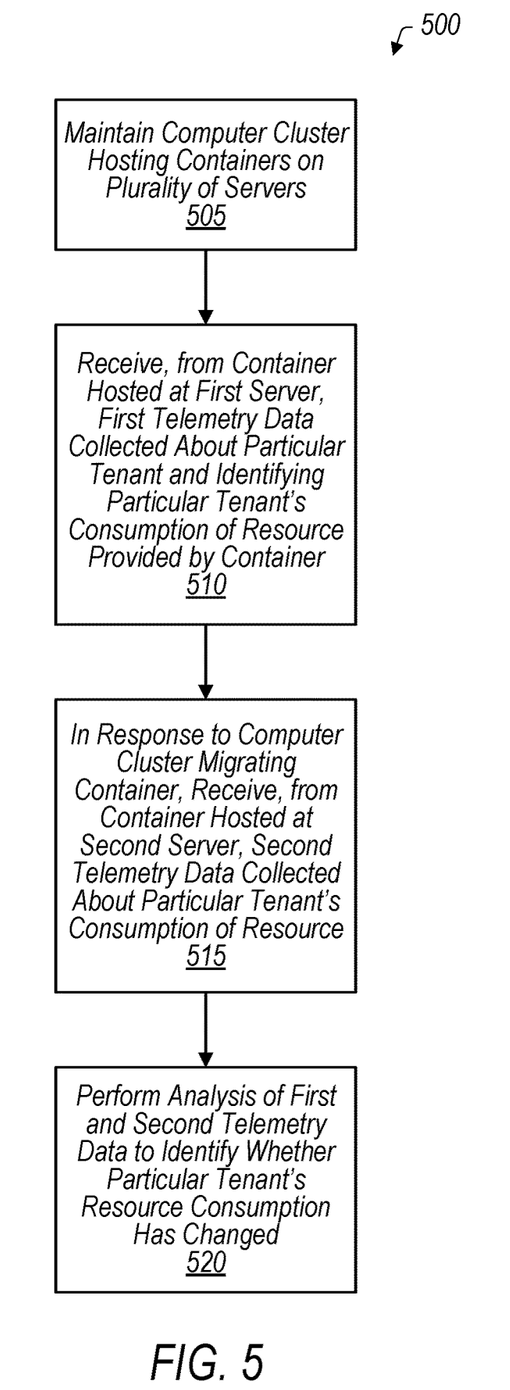
FIG. 5 is a flow diagram illustrating one embodiment of a method performed by components within the monitoring system.

Turning now to FIG. 5, a flowchart of a method 500 is shown. Method 500 is one embodiment of a method performed by a computing system such as monitoring system 10. In many instances, performance method 500 may allow for greater insight into a distributed computing system with multiple tenants.

Method 500 begins, in step 505, with maintaining a computer cluster (e.g., distributed computing system 100) that hosts containers (e.g., containers 112) accessible to a plurality of tenants of the computer cluster. In step 510, first telemetry data (e.g., telemetry data 118) collected about a particular one (e.g., tenant B) of the plurality of tenants is received from a container hosted at a first (e.g., host server 110A) of a plurality of servers of the computer cluster. In various embodiments, the first telemetry data identifies the particular tenant's consumption of a resource (e.g., resource 114) provided by the container. In step 515, in response to the computer cluster migrating the container from the first server to a second (e.g., host server 110B) of the plurality of servers, second telemetry data collected about the particular tenant's consumption of the resource is received from the migrated container hosted at the second server. In step 520, analysis of the first and second telemetry data is performed to identify whether the particular tenant's consumption of the resource has changed.

Exemplary Computer System

Figure 6:
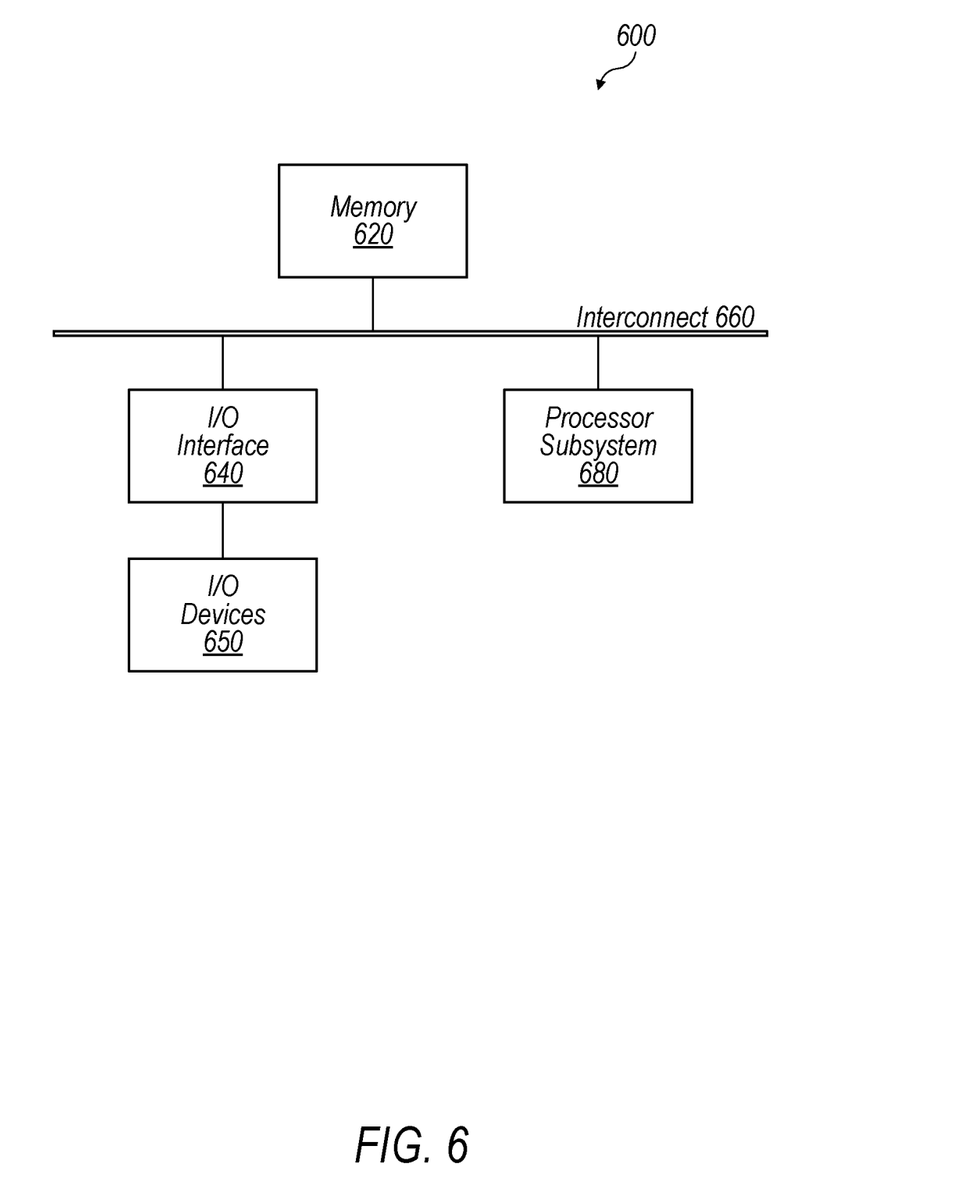
FIG. 6 is a block diagram illustrating one embodiment of an exemplary computer system.

Turning now to FIG. 6, a block diagram of an exemplary computer system 600, which may be used to implement one or more components monitoring system 10 (such as clients 20, servers 110, database 130, etc.) is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Computer system 600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In some embodiments, memory 920 may containers 112, curation and analytics unit 120, and/or database 130.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A non-transitory computer readable medium having program instructions stored thereon that are capable of causing a computing system to implement operations comprising:
   maintaining a computer cluster that hosts containers accessible to a plurality of tenants of the computer cluster;
   receiving, from a container hosted at a first of a plurality of servers of the computer cluster, first telemetry data collected about a particular one of the plurality of tenants, wherein the first telemetry data identifies the particular tenant's consumption of a resource provided by the container, and wherein the first telemetry data includes telemetry data received about an application from a monitoring agent executing in the container with the application;
   in response to the computer cluster migrating the container from the first server to a second of the plurality of servers, receiving, from the monitoring agent executing in the migrated container hosted at the second server, second telemetry data collected about the particular tenant's consumption of the resource; and
   performing analysis of the first and second telemetry data, wherein the analysis includes:
      correlating telemetry data collected about the particular tenant by a plurality of sources, wherein the correlating is based on timing of events identified in the correlated telemetry data; and
      identifying a signature from ones of the events occurring with a same time interval, wherein the signature is indicative of a potential problem.

2. The computer readable medium of claim 1, wherein the resource is an application executing within the container; and
   wherein the first and second telemetry includes usage metrics for a plurality of users of the particular tenant that interact with the application.

3. The computer readable medium of claim 2, wherein the usage metrics includes a time value indicative of how long a user has used the application and a frequency value indicative of how frequently a user has used the application.

4. The computer readable medium of claim 2, wherein receiving the first telemetry data includes:
   the monitoring agent within the container reading a log produced by the application; and
   receiving, from the monitoring agent, first telemetry data that includes information read from the log.

5. The computer readable medium of claim 1, wherein the resource is a hardware component of the first and second servers; and
   wherein the first and second telemetry data include utilizations of the hardware component by the particular tenant over time.

6. The computer readable medium of claim 1, wherein the operations further comprising:

receiving telemetry data from a container manager that instantiates the container and determines to migrate the container from the first server to the second server; and wherein the analysis is further based on the telemetry data from the container manager.

7. The computer readable medium of claim 1, wherein the first and second telemetry data is tagged with a unique identifier of the particular tenant to indicate that the first and second telemetry data pertains to the particular tenant.

8. The computer readable medium of claim 1, wherein the analysis includes:
establishing a baseline for the particular tenant's consumption of the resource; and
identifying whether a deviation from the baseline has occurred.

9. The computer readable medium of claim 8, wherein the operations comprising:
presenting a notification of the potential problem to an administrator associated with the tenant via a user interface.

10. The computer readable medium of claim 8, wherein the analysis includes:
correlating additional telemetry data collected about others of the plurality of tenants based on timing of events identified the additional correlated telemetry data; and
identifying the signature based on the events identified in the additional correlated telemetry data.

11. A method, comprising:
instantiating, by a first host server of a computer cluster, a plurality of containers that provide resources used by a plurality of tenants of the computer cluster;
providing, by the first host server, first telemetry data collected from one or more of the containers associated with a particular one of the plurality of tenants, wherein the first telemetry data includes data about the particular tenant's use of one or more resources provided by the one or more containers, and wherein the first telemetry data includes telemetry data received about an application from a monitoring agent executing in a container with the application;
migrating, from the first host server to a second host server of the computer cluster, the one or more containers of the particular tenant, where the second host server is configured to provide, from the monitoring agent executing in the migrated container hosted at the second server, second telemetry data about the particular tenant's use of the one or more resources for analysis; and
providing, by the first host server and to a computing system, telemetry data collected from the plurality of containers about the plurality of tenants' usage of resources provided by the containers; and
wherein the computing system is configured to identify a problem associated with the particular tenant by analyzing the first telemetry data, the second telemetry data, telemetry data collected about others of the plurality of tenants.

12. The method of claim 11, wherein the one or more resources include an application executing with one of the one or more containers; and
wherein the first telemetry data includes data collected from a log produced by the application.

13. The method of claim 11, further comprising:
collecting, by the first host server, hardware usage data identifying the one or more container's use of hardware resources of the first host server, wherein the hardware resources include processors and memory of the first host server; and
wherein the first telemetry data includes the hardware usage data.

14. The method of claim 11, further comprising:
collecting telemetry data from a container manager that instantiated the plurality of containers; and
wherein the first telemetry data includes telemetry data collected from the container manager about the particular tenant.

15. The method of claim 11, wherein the analysis includes:
establishing a baseline for the particular tenant's consumption of the resource; and
identifying whether a deviation from the baseline has occurred.

16. A non-transitory computer readable medium having program instructions stored thereon that are capable of causing a computer cluster to implement operations comprising:
receiving, at a first server of the computer cluster, containers migrated from other servers of the computer cluster, wherein the containers include one or more containers associated with a particular one of a plurality of tenants, wherein one of the containers includes a monitoring agent executing in the container with an application;
hosting, by the first server, the one or more containers along with containers associated with others of the plurality of tenants; and
receiving telemetry data collected about the particular tenant's usage of one or more resources provided by the hosted one or more containers, wherein the telemetry data includes telemetry data received about the application from the monitoring agent executing in the container with the application; and
performing analysis of the received telemetry data, wherein the analysis includes:
correlating telemetry data collected about the particular tenant by a plurality of sources, wherein the correlating is based on timing of events identified in the correlated telemetry data; and
identifying a signature from ones of the events occurring with a same time interval, wherein the signature is indicative of a potential problem.

17. The computer readable medium of claim 16, wherein the one or more resources include a network interface used by a client device of the particular tenant to communicate with an application included in one of the hosted one or more containers; and
wherein the telemetry data includes a latency value identifying a latency for communicating between the application and the client device via the network interface.

18. The computer readable medium of claim 16, wherein the one or more resources include processors of the first server that execute program instructions included in the one or more containers; and
wherein the telemetry data include a current usage of the processors by the one or more containers associated with the particular tenant.

19. The computer readable medium of claim 16, wherein the one or more resources include a data set included in one of the hosted one or more containers and accessed by an application executing on the first server; and
wherein the telemetry data includes a size of the data set.

20. The computer readable medium of claim 16, wherein the receiving includes:
   tagging the telemetry data with a unique identifier of the particular tenant to differentiate between the telemetry data collected about the particular tenant's usage and telemetry data collected about others of the plurality of tenants.

\* \* \* \* \*